United States Patent [19]

Sasaki

[11] Patent Number: 5,357,103
[45] Date of Patent: Oct. 18, 1994

[54] LIGHT RECEIVING MODULE WITH OPTICAL FIBER COUPLING

[75] Inventor: Goro Sasaki, Yokohama, Japan

[73] Assignee: Sumitomo Electric Industries, Inc., Japan

[21] Appl. No.: 953,082

[22] Filed: Sep. 29, 1992

[30] Foreign Application Priority Data

Oct. 2, 1991 [JP] Japan .................................. 3-255382
Oct. 3, 1991 [JP] Japan .................................. 3-256525

[51] Int. Cl.$^5$ ........................................ H01J 5/16
[52] U.S. Cl. ................................. 250/227.24; 385/31
[58] Field of Search ...................... 250/227.11, 227.24, 250/239, 227.14; 257/98, 82; 385/47, 31

[56] References Cited

U.S. PATENT DOCUMENTS

| 4,210,923 | 7/1980 | North et al. ............................ 357/30 |
| 4,756,590 | 7/1988 | Forrest et al. ..................... 350/96.15 |
| 4,772,787 | 9/1988 | Trommer ............................. 250/227 |

FOREIGN PATENT DOCUMENTS 192850 9/1986 European Pat. Off. .

OTHER PUBLICATIONS

Patent Abstracts of Japan, vol. 10, No. 19 (P-423) (2076) 24 Jan. 1986 & JP-A-60 172 004 (Fujitsu K.K.) dated 5 Sep. 1985.
Patent Abstracts of Japan, vol. 5, No. 17 (P-47) (689) 31 Jan. 1981 & JP-A-55 145 408 (Nippon Denshin Denwa Kosha) dated 14 Nov. 1980.
Patent Abstract of Japan, vol. 12, No. 99 (E-594) (2946) 31 Mar. 1988 & JP-A-62 230 065 (Mitsubishi Electric Corp) dated 8 Oct. 1987.
Patent Abstracts of Japan, vol. 7, No. 51 (P-179) (1196) & JP-A-57 198 420 (Fujitsu K.K.) dated 6 Dec. 1982.

*Primary Examiner*—David C. Nelms
*Attorney, Agent, or Firm*—Beveridge, DeGrandi, Weilacher & Young

[57] ABSTRACT

A light receiving module and its manufacturing method of an excellent structure which can make a good and uniform optical couple between an optical fiber and a light receiving element, and can improve its productivity. The light receiving module comprises a semiconductor substrate, a light receiving element mounted on a surface of the semiconductor substrate, a groove formed on a back surface of the semiconductor substrate, an inclined face in the back surface side facing the light receiving element, and an optical fiber fixed in the groove. A transmitted light signal through the fiber is reflected by the inclined face. The inclined face is formed at a distal end of the optical fiber, at the closed end wall of the groove, or a side wall of a dimple arranged on the extension line of the groove. The reflected light is admitted to a light receiving face of the light receiving element, from the back surface side of the semiconductor substrate.

6 Claims, 7 Drawing Sheets

LIGHT RECEIVING MODULE WITH OPTICAL FIBER COUPLING

BACKGROUND OF THE INVENTION

1. Field of the Invention

The present invention relates to a light receiving module used for an optical fiber communication and a manufacturing method of the light receiving module, in particular to such a light receiving module providing a good and uniform optical couple especially in case of a plurality of optical fibers in array.

2. Related Background Art

Light receiving modules disclosed in "IEICEJ Technical Report, Vol. 91, No. 201 (OQE91-60 to 68)" published by Institute of Electronics Information and Communication Engineers are conventionally known. FIG. 1 and FIG. 2 show structures of them.

According to the light receiving module of FIG. 1, an IC chip 6 in which a pre-amplifier circuit is formed and a light receiving element 4 are placed inside a lower package 2, an optical fiber 8 is vertically fixed to an upper package 10, where a distal end of the optical fiber faces the light receiving face of the light receiving element 4, and the lower package 2 and the upper package 10 are hermetically sealed to prevent light from leaking into the module.

And the module receives a light transmitted through the optical fiber 8 on the light receiving element 4 and converts the light signal to an electrical signal. Further, the electrical signal is amplified by the pre-amplifier circuit in the IC chip 6 and is output through a lead terminal 12.

According to the light receiving module of FIG. 2, an IC chip 18 in which a pre-amplifier circuit is formed and a light receiving element 16 are placed inside a package 14 which has a hermetically sealed construction to prevent light from leaking into the module, where a distal part of the optical fiber 20 is arranged in parallel with the light receiving face of the light receiving element 16. The distal end of the optical fiber 20 is cut slantingly and polished, so that light transmitted through the optical fiber 20 is reflected by the polished face 22 and is admitted in the light receiving face of the light receiving element 16.

And, the electrical signal, converted from the light signal in the light receiving element 16, is amplified by the pre-amplifier circuit in the IC chip 18 and is output through a lead terminal (not shown in the drawing).

However, in the conventional light receiving modules of the constructions described above, an IC chip, a light receiving element and an optical fiber are arranged and fixed independently each other in a unit.

Namely, precision of facing location between the optical fiber and the light receiving element is governed by precision of location of each component, resulting in wide dispersion of light receiving sensitivity or difficulty in manufacturing modules within predetermined tolerances of light receiving sensitivity since the modules should be fabricated tuning the location of each component one by one. Consequently, productivity of the modules could not be improved.

Especially, in a light receiving module in which a plurality of optical fibers and a plurality of corresponding light receiving elements are set in array for doing a parallel communication, optical couples between the optical fibers and the light receiving elements should be good and uniform through out all of the combinations, which requires a very high mechanical precision. Consequently, it was very difficult to accomplish a good productivity from the point of yield rate, etc.

SUMMARY OF THE INVENTION

Accordingly, it is an object of the present invention to eliminate the above mentioned drawbacks of the prior art.

More particularly, it is an object of the present invention, to provide a light receiving module of an excellent structure which can make an optical couple between an optical fiber and a light receiving element good and uniform and improve a productivity.

According to the present invention, there is provided: a light receiving module, comprising: a semiconductor substrate; a light receiving element mounted on a front surface of the semiconductor substrate; a groove formed in a back surface of the semiconductor substrate, facing the light receiving element and having a closed end wall; an optical fiber fixed in the groove, a distal end of the optical fiber being located at the closed end wall; and an inclined face facing a light receiving face of the light receiving element at an acute angle with the light receiving face, so as to reflect a light signal transmitted through the optical fiber to let the light signal be admitted to the light receiving face of the light receiving element, from the back surface side of the semiconductor substrate.

In a preferred embodiment of the present invention, the inclined face is formed at a distal end of the optical fiber and the distal end abutting against a closed end wall of the groove for the optical fiber, or, at the closed end wall of the groove in the semiconductor substrate.

In another preferred embodiment, the present invention may permit of further comprising a dimple formed in the semiconductor substrate, on an extension line of the groove beyond the closed end wall of the groove, wherein the inclined face is formed at a side wall of the dimple. The side wall faces the closed end wall of the groove.

A light receiving module according to another aspect of the present invention comprises a plurality of elements, namely light receiving elements, optical fibers, grooves, inclined faces etc. in a semiconductor substrate. The elements are set in array, and the relation between the components in one combination, a light receiving element, an optical fiber etc. is just the same as described above. The present invention provides a uniform performance among the combinations in array.

To attain the aforementioned objects, the present invention also provides a method of manufacturing a light receiving module which comprises the step of forming a light receiving element on a front surface of a semiconductor substrate, forming a photo-resist on a back surface of the semiconductor substrate covering a surface other than a surface whereon a groove is formed. Here, a closed end wall of the groove is determined approximately facing a light receiving face of the light receiving element. And, the location of the closed end wall is determined by using a double-side mask aligner.

The method also comprises forming the groove by a chemical wet etching, using the photo-resist as an etching mask, removing the photo-resist, placing an optical fiber in the groove and further the semiconductor being assembled in a package. Where a direction of a crystal of the semiconductor substrate is chosen so that the closed end wall is inclined at an desired angle.

According to the manufacturing method of the present invention, a light receiving element may be formed after a corresponding groove is formed.

According to the above described invention, an optical signal transmitted through the optical fiber fixed in the groove is reflected by the inclined face and is admitted to the light receiving element from the back surface side of the semiconductor substrate, and then realizes an optical couple with extremely high precision between the optical fiber and the light receiving element. And further, an excellent durability is attained since no mechanically movable parts exist.

Here, "mechanically movable parts" means parts which are mechanically fixed each other and are possible to relatively move each other.

And, the groove can be formed with a high precision of location using a conventional method such as planar process, and a uniformity and an improvement of characteristics can be easily realized and the productivity can be improved.

The present invention will become more fully understood from the detail description given herein below and the accompanying drawings which are given by way of illustration only, and thus are not to be considered as limiting the present invention.

Further scope of applicability of the present invention will become apparent from the detailed description given herein after. However, it should be understood that the detailed description and specific examples, while indicating preferred embodiments of the invention, are given by way of illustration only, since various changes and modification within the spirit and scope of the invention will become apparent to those skilled in the art from this detailed description.

BRIEF DESCRIPTION OF THE DRAWINGS

These and other objects, features and advantages of the present invention will be more fully appreciated with reference to the accompanying figures.

DETAILED DESCRIPTION OF THE PREFERRED EMBODIMENT

An embodiment of a light receiving module according to the present invention is described with drawings in the following.

Figure 1:
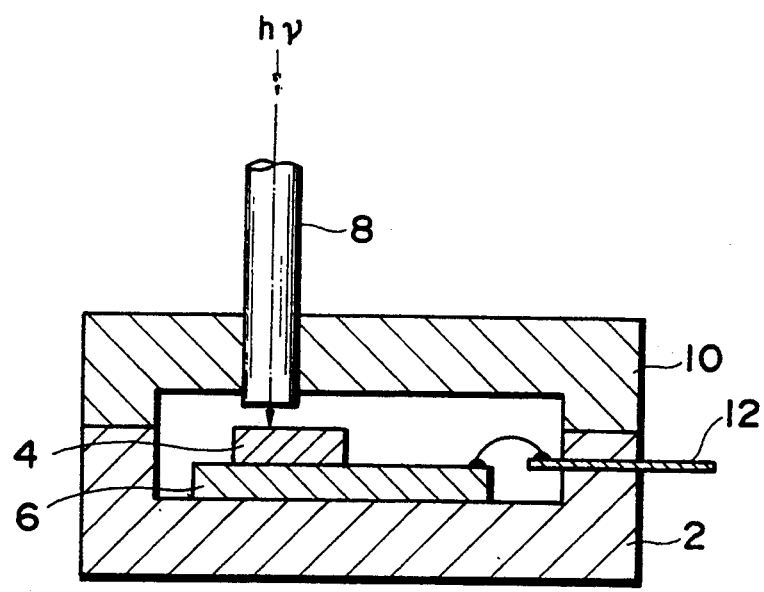
FIG. 1 is a cross sectional drawing showing an outline structure of a conventional light receiving module.
Figure 2:
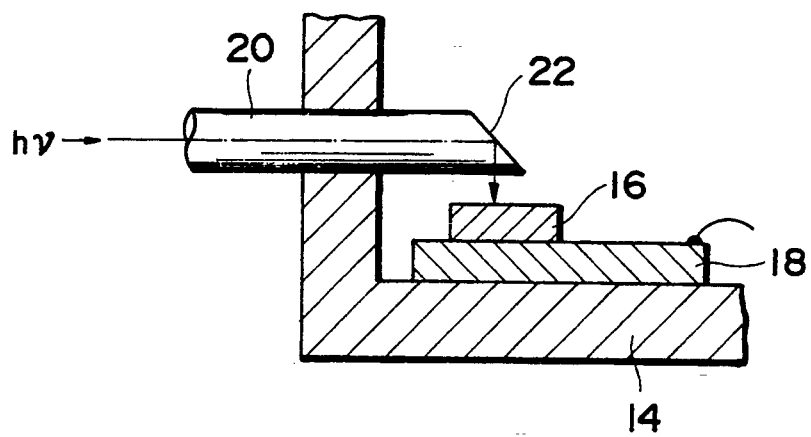
FIG. 2 is a cross sectional drawing showing an outline structure of another conventional light receiving module.
Figure 3:
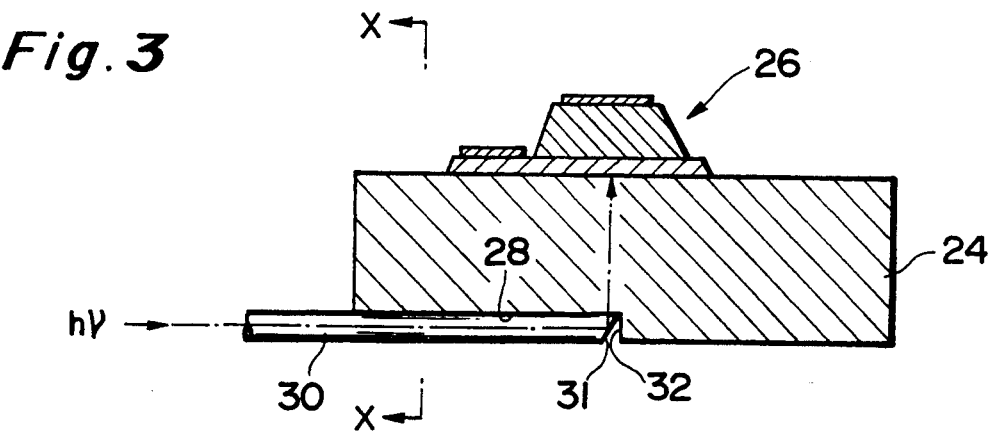
FIG. 3 is a vertical cross sectional drawing showing a main part structure of an embodiment of the present invention.

Reference is first made to FIG. 3 showing a basic light receiving module in which a light receiving element 26 receives a light signal transmitted through an optical fiber 30. FIG. 3 shows a structure in which a light receiving element 26 is mounted on the front side of a semiconductor substrate 24 made of indium-phosphide crystal, an optical fiber 30 is fitted and fixed in a long groove 28 formed in the back side of the semiconductor substrate 24, and a light signal transmitted through the optical fiber 30 is admitted in the light receiving element 26 at the front surface of the semiconductor substrate 24 from its back side.

Indium-phosphide (InP) is transparent for 1.3 micron-meter light wave, and also a light receiving element for 1.3 micron-meter light wave can be easily formed on an InP substrate, which is favorable to the present invention. GaAs, InAs, InSb, GaP, Si etc. can be used, too.

Here, the light receiving element 26 is basically an avalanche photo-diode or a PIN type photo-diode in which PN junction is formed on a gallium-indium-arsenic layer, and the diameter of the light receiving face is usually determined at about 30 to 80 micron-meter in diameter.

The groove 28 is formed in the back surface of the semiconductor substrate 24 by a chemical wet etching process about 50 micron-meter in depth. And the closed end wall 32 of the groove 28 is designed to locate at the place approximately vertically corresponding position to the light receiving face of the light receiving element 26.

The etching depth should be enough to fix the optical fiber 30, and approximately 50 micron-meter or larger may be acceptable, depending on the fiber diameter.

Figure 4:
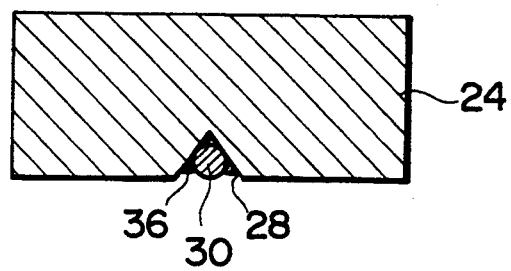
FIG. 4 is a X—X sectional drawing viewed in the arrow mark direction in FIG. 3.
Figure 5:
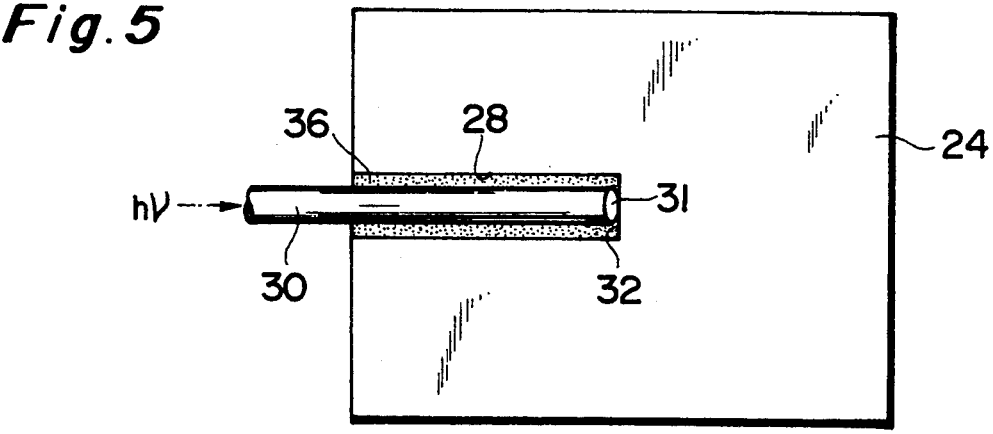
FIG. 5 is a back side plan view showing a structure viewed from a back side of the semiconductor substrate of the embodiment of FIG. 3.

The inclined face 31 of about 45 degree is formed by polishing at the distal end of the optical fiber 30. The light signal transmitted through the optical fiber 30 can be reflected by the inclined face 31 and laterally emitted. The optical fiber 30 is fitted in the groove 28 and the distal end of the optical fiber 30 abuts against the closed end wall 32 of the groove 28 to be precisely located. And the inclined face 31 is directed outside so that the light signal transmitted through the optical fiber 30 is reflected by the inclined face 31 and emitted to the light receiving face of the light receiving element 26. FIG. 4 is a X—X cross sectional drawing viewed from the direction indicated by arrows in FIG. 3. FIG. 5 is a back side view viewed from the back side of the semiconductor substrate 24, in the embodiment of FIG. 3. And then the optical fiber 30 is fixed in the groove 28 with thermosetting adhesive or solder 36 as shown in FIG. 4 and FIG. 5.

And the entire set of the semiconductor 24 on which the light receiving element 26 and the optical fiber 30 are fixed as a unit is contained in a package (not shown) which has a sealed construction to prevent light from leaking into. An IC chip (not shown) whereon a pre-amplifier circuit is formed to amplify an electrical signal converted from optical signal in the light receiving element 26, and the like, are placed in the package together.

The other embodiment of a light receiving module according to the present invention is described with drawings in the following.

Figure 6:
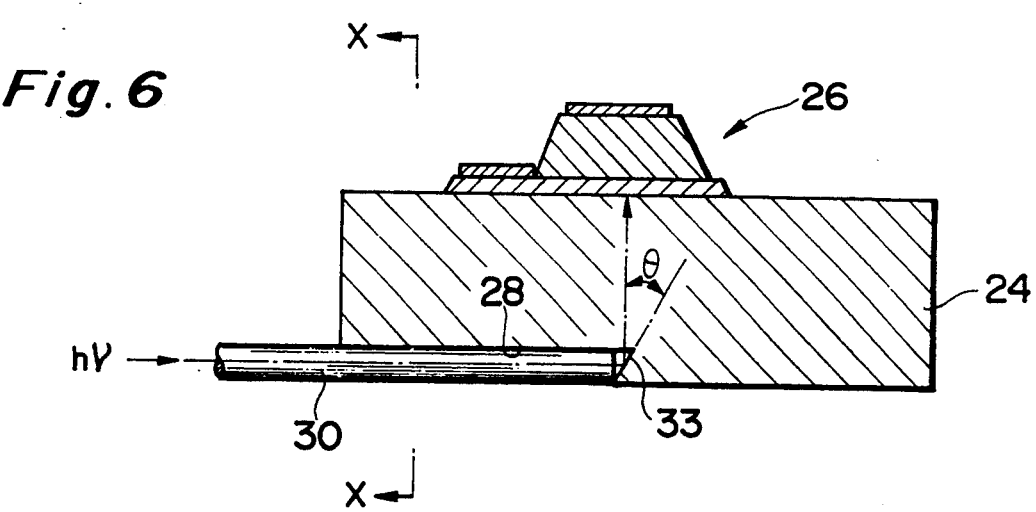
FIG. 6 is a vertical cross sectional drawing showing a main part structure of an embodiment of the present invention.

Reference is made to FIG. 6 showing a basic light receiving module in which a light receiving element 26 receives a light signal transmitted through an optical fiber 30, just the same as the embodiment shown in FIG. 3, where the light signal is admitted in the light receiving element 26 at the front surface of the semiconductor substrate 24 from its back side.

Here, in the same manner as in case of FIG. 3, the light receiving element 26 is basically an avalanche photo-diode or a PIN type photo-diode in which PN junction is formed on a gallium-indium-arsenic layer, and the diameter of the light receiving face is usually determined at about 30 to 80 micron-meter in diameter.

The groove 28 is formed in the back surface of the semiconductor substrate 24 by a chemical wet etching process about 100 micron-meter in depth. And the closed end of the groove 28 is designed to locate at the place approximately facing the light receiving face of the light receiving element 26. And the closed end wall constitutes an inclined face 33, which is at an acute angle to the light receiving face of the light receiving element 26.

The etching depth should be enough for the inclined face to accommodate the light from the optical fiber 30, and approximately 100 micron-meter or larger may be acceptable, depending on the fiber diameter.

A distal end of the optical fiber 30 is cut at 90 degree to the axis of the optical fiber 30, and the optical fiber 30 is set and fixed in the groove 28 so that the distal end faces or abuts the inclined face 33. And an optical signal transmitted through the optical fiber 30 and output from the distal end is reflected by the inclined face 33 and is admitted to the light receiving face of the light receiving element 26 after passing through the semiconductor substrate 24 from the back side of the substrate.

Figure 7:
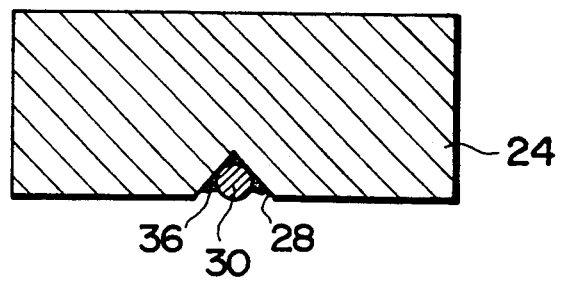
FIG. 7 is a X—X sectional drawing viewed in the arrow mark direction in FIG. 6.
Figure 8:
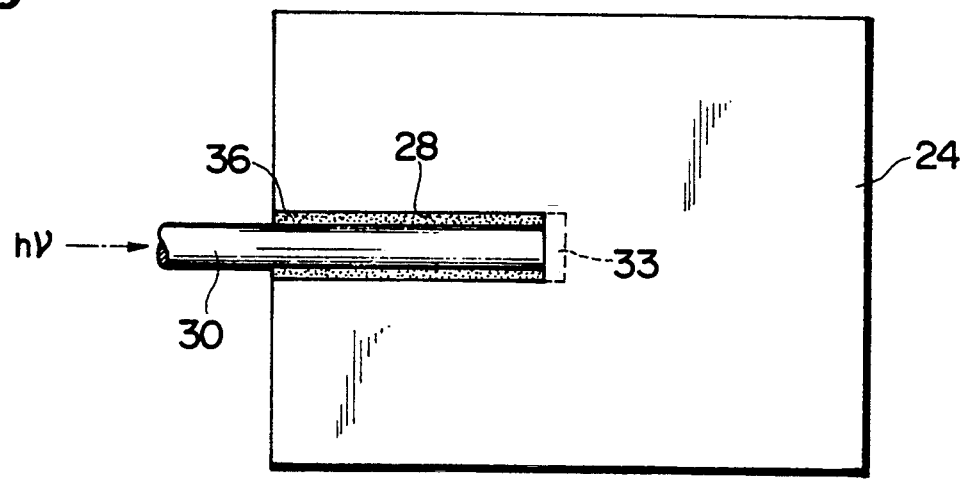
FIG. 8 is a back side plan view showing a structure viewed from a back side of the semiconductor substrate of the embodiment of FIG. 6.

FIG. 7 is a X—X cross sectional drawing viewed from the direction indicated by arrows in FIG. 6. FIG. 8 is a back side view viewed from the back side of the semiconductor substrate 24, in the embodiment of FIG. 6. The optical fiber 80 is fixed in the groove 28 with thermosetting adhesive or solder 36 as shown in FIG. 7 and FIG. 8.

And, in the same manner as in the embodiment of FIG. 3, the entire set of the semiconductor 24 on which the light receiving element 26 and the optical fiber 80 are fixed as a unit is contained in a package (not shown) which has a sealed construction to prevent light from leaking into. An IC chip (not shown) whereon a pre-amplifier circuit is formed to amplify an electrical signal converted from an optical signal in the light receiving element 26, and the like, are placed in the package together.

Figure 9:
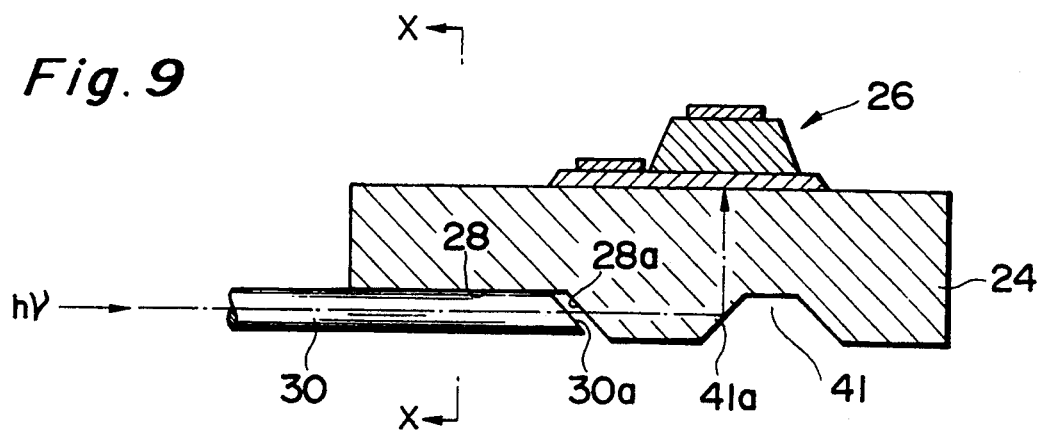
FIG. 9 is a vertical cross sectional drawing showing a main part structure of an embodiment of the present invention.
Figure 10:
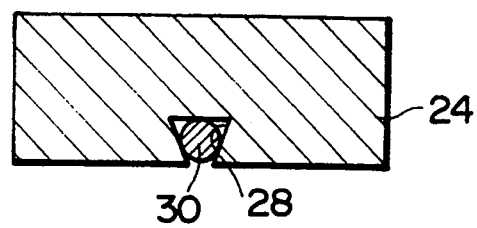
FIG. 10 is a X—X sectional drawing viewed in the arrow mark direction in FIG. 9.
Figure 11:
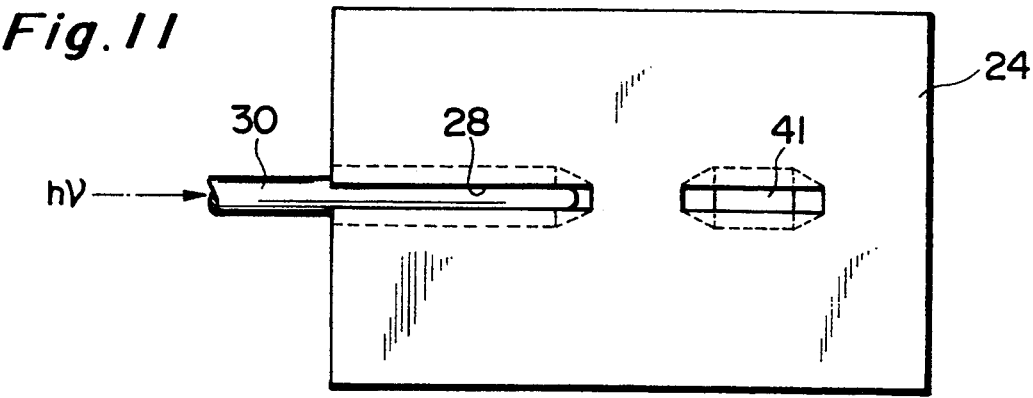
FIG. 11 is a back side plan view showing a structure viewed from a back side of the semiconductor substrate of the embodiment of FIG. 9.

The other embodiment of the present invention is shown in FIG. 9. FIG. 10 is a X—X cross sectional drawing viewed from the direction indicated by arrows in FIG. 9. FIG. 11 is a back side view viewed from the back side of the semiconductor substrate 24, in the embodiment of FIG. 9. There is a dimple 41 formed in a semiconductor substrate 24, on the extension line of the groove 28 beyond the closed end wall 28a of the groove 28. An inclined face 41a is formed, which is one of the walls of the dimple 41 and faces the closed end wall 28a of the groove 28 in a back surface of the semiconductor substrate 24.

The inclined face 41a is arranged so as to make an obtuse angle with the back surface of the semiconductor substrate, and to face the light receiving face of the light receiving element 26 at an acute angle. A light signal transmitted through the optical fiber 30 penetrates the distal end 30a of the optical fiber 30 and the closed end wall 28a of the groove 28 of the semiconductor substrate 24, before it is reflected by the inclined face 41a and is admitted to the light receiving element 26.

The optical fiber 30 is usually cut 90 degrees to the axis of the fiber at the distal end, but the other angle is also acceptable especially approximately the same angle as that of the inclined face 28a. In case of the 90 degrees, the gap between the distal end of the optical fiber 30 and the inclined face 28a may be void or of air, but should preferably be filled up with a filling material of nearly a same refractive index as the semiconductor substrate, to improve the light penetration.

In case of the fiber distal end inclined, the gap between the inclined distal end 30a of the optical fiber 30 and the inclined face 28a should preferably be filled up with a filling material of nearly a same refractive index as the optical fiber 30, to improve the light penetration.

The dimple 41 may be void or of air, or filled up with a filling material of as lower refractive index as possible compared to the semiconductor substrate. So, a light signal incidents on the inclined face 41a from the higher refractive index side of the semiconductor substrate 24 to the lower refractive index side 41 and is reflected by the inclined face 41a. This provides a total reflection or a high rate reflection. An aluminum or silver deposit or the like may be applied on the wall 41a of the dimple 41 to improve reflection rate. The deposit treatment only in the dimple 41 is relatively easy because the groove 28 and the dimple 41 are separate each other.

Figure 12B:
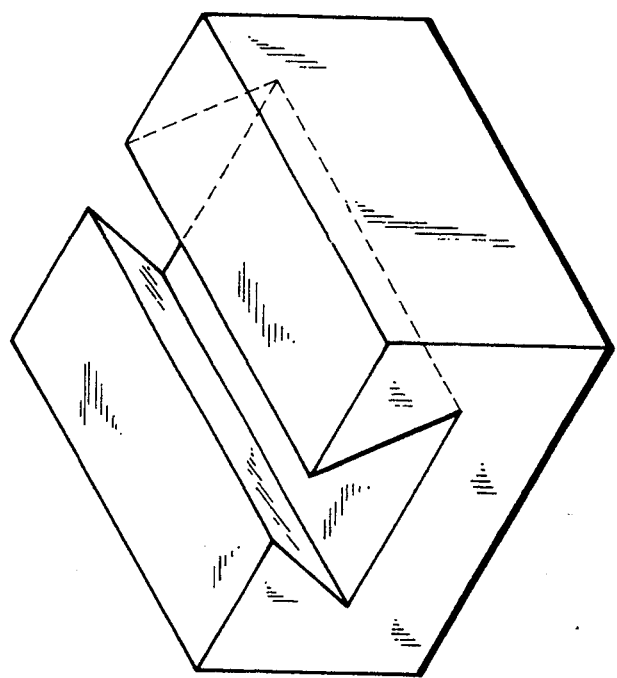
FIG. 12B is a perspective drawing showing an outline structure of a reverse mesa groove.
Figure 12A:
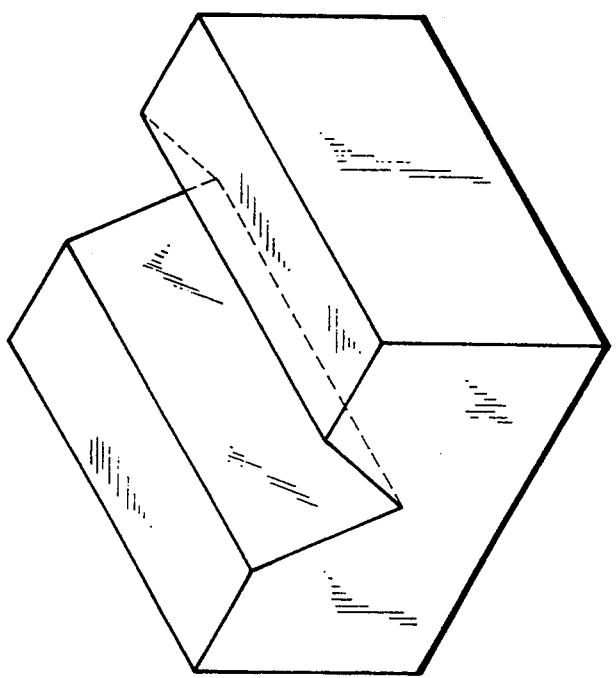
FIG. 12A is a perspective drawing showing an outline structure of a normal mesa groove.

The inclined face 41a should be arranged so as to face both the face 28a and the light receiving face of the light receiving element 26. When the inclined face 41a is formed by etching process, the direction of the groove 28 is set on the semiconductor substrate 24 considering the crystal direction of the semiconductor so that the face 41a may be of normal mesa as shown in FIG. 12A. In this case, the groove 28 to fix an optical fiber 30 is of reverse mesa as shown in FIG. 10 or FIG. 12B. Then, the optical fiber 30 is inserted into the reverse mesa groove 28 in the longitudinal direction and fixed with thermosetting adhesive or solder(not shown) as shown in FIG. 10 and FIG. 11.

When referred to as a dimple 41, it may be a groove having a wall, where an inclined face 41a can be formed. The inclined face 41a may be at either a closed end wall or a longitudinal wall. In the latter case, the groove 28 may be one which is formed making a right angle with the groove 28 for the optical fiber 30.

Figure 13A:
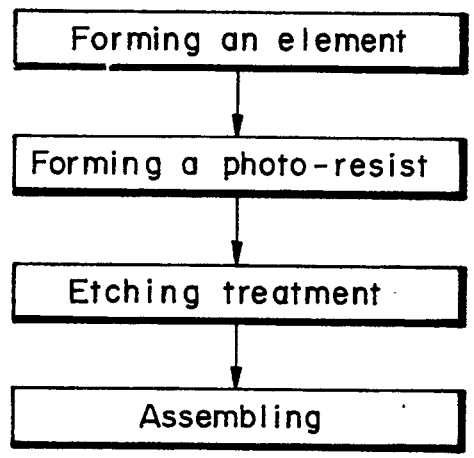
FIG. 13A is a flow chart showing an embodiment of a manufacturing method of the present invention.
Figure 13B:
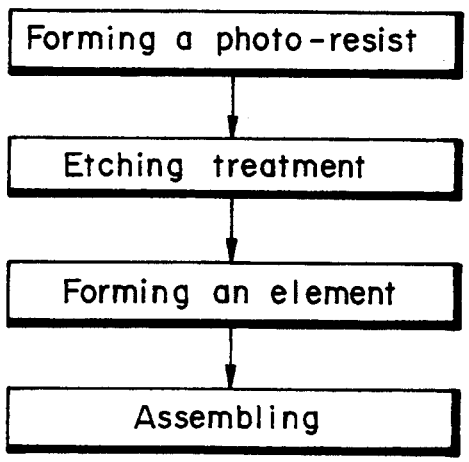
FIG. 13B is a flow chart showing another embodiment of a manufacturing method of the present invention.

Next, a manufacturing process of the light receiving module having the above mentioned structure is described hereafter according to the flow chart of FIG. 13A and FIG. 13B.

Reference is first made to FIG. 13A showing a flow chart of a first manufacturing embodiment.

Firstly, in the first step, a light receiving element(s) 26 and the other necessary element(s) are formed on a front surface of a semiconductor substrate 24.

In the second step following the first step, a photoresist is applied on the rest of the back surface where the groove 28 should be formed as an etching mask, on the back surface of the semiconductor substrate 24, using a double-side mask aligner. The groove 28 is designed so that the closed end wall of the groove 28 locates approximately at a position facing the light receiving face of the light receiving element 26. The double-side mask aligner determines the location of the closed end wall. Following the locating step, the photoresist is exposed to light and developed and form the etching mask.

In case of the embodiment of FIG. 9, the dimple 41 is located so that a side wall 41a faces the light receiving face of the light receiving element 26, and the dimple 41 is formed together with the groove 28.

Next, in the third step, with the etching mask of the photo-resist, the other surface than covered with the photo-resist is etched by a chemical wet etching process using an etching liquid. The treatment forms the groove 28. An etching liquid is for example a liquid containing sulfuric acid and hydrogen peroxide, a liquid containing bromine and methanol, or the like. The former liquid enables an easy control of a bottom surface forming and tends to provide a smooth surface at the bottom. The latter example of etching liquid tends to provide a smooth face at a reverse mesa surface, which is especially favorable in an embodiment using a reverse mesa surface as a reflecting surface.

The etching depth should be enough to fix the optical fiber 30, in case of the embodiment of FIG. 3, and approximately 50 micron-meter or larger may be acceptable, although it depends on the fiber diameter. And, it should be enough for the inclined face to accommodate the light from the optical fiber 30, in case of the embodiment of FIG. 6, and approximately 100 micron-meter or larger may be acceptable, also depending on the fiber diameter.

In a process of the present invention, anisotropic etching is used.

In the fourth step following the third step, the photoresist is removed.

In the fifth step following the fourth step, an adhesive or the like is applied in the groove 28. And then the optical fiber 30 is fitted in the groove 28. In case of the embodiment manufacturing the light receiving module of FIG. 3, the groove 28 is arranged so that the light deflected by the inclined face 31 should be directed to the light receiving element 26. The distal end of the optical fiber 30 should abut against or be in contact with the closed end wall 32, especially in case of the embodiment of FIG. 3, for the location of the inclined face to be precisely determined. In case of the embodiments of FIG. 6 and FIG. 9, the optical fiber should not necessarily abut against the closed end wall 33 or 28a of the groove 28. And then, the optical fiber is fixed on the back side of the semiconductor substrate 24 with the adhesive 36.

The adhesive 36 or the like may be applied after the optical fiber 30 is placed in the groove 28. Further the semiconductor substrate 24 is assembled in a package and the assembling process is finished.

According to the structure and the manufacturing steps of the embodiment described above, the facing precision between the light receiving element 26 and the inclined face 31, 33 or 41a can be easily set within 1 micron-meter even if using a well known basic planar process or the like, and consequently a very highly precise optical couple between the optical fiber 30 and the light receiving element 26 can be realized. And since any mechanically movable parts are eliminated, an excellent durability is attained.

In case of the embodiments manufacturing the light receiving modules of FIG. 3 and FIG. 6, the treatment of the third step forms the groove 28, side walls of which are constituted by etching surfaces $(01\bar{1})$ and $(0\bar{1}1)$ being at an obtuse angle to the back surface $(100)$ of the semiconductor substrate 24. At the same time during the third step, the inclined face 33 is formed at an acute angle of about 54 degrees (in case of InP) at the closed end wall of the groove 28 facing the light receiving element 28, when a reverse mesa (overhanging wall shape) is formed at an acute angle to the back side depending on the crystal orientation of the semiconductor substrate 24. Especially, in case of the embodiment of FIG. 6, the closed end wall 33 should be of a reverse mesa, because the inclined closed end wall 33 is used as a reflecting face.

In case of the embodiment manufacturing the light receiving module of FIG. 9, during the third step, longitudinal walls of the groove 28 are formed to a reverse mesa and the closed end wall 28a and the inclined face 41a should be formed to a normal mesa. It is because the inclined face 41a is used as a reflecting face. The crystal orientation or direction of the semiconductor substrate is chosen so that the closed end wall 28a and the inclined face 41a become of a normal mesa.

In case of the embodiment of FIG. 3, this crystal orientation may be adopted, too, because the closed end wall 32 is used only as a stopper to locate the distal end of the optical fiber, and the inclination angle of the distal end of the optical fiber is usually 45 degrees, different from that of the closed end wall 32.

If the angle of the closed end wall 32 is made 90 degrees in case of FIG. 3, using isotropic etching, the distal end of the fiber may be more easily located.

Usually, the optical fiber had better be placed before the adhesive is applied. It is true especially in case of a reverse mesa groove.

Reference is next made to FIG. 13B showing a flow chart of a second manufacturing embodiment.

In this embodiment, the first step or the step forming light receiving element 26 follows the fourth step or the step removing a photo-resist, while the treatment of each step remains the same as in the first manufacturing embodiment.

Figure 14:
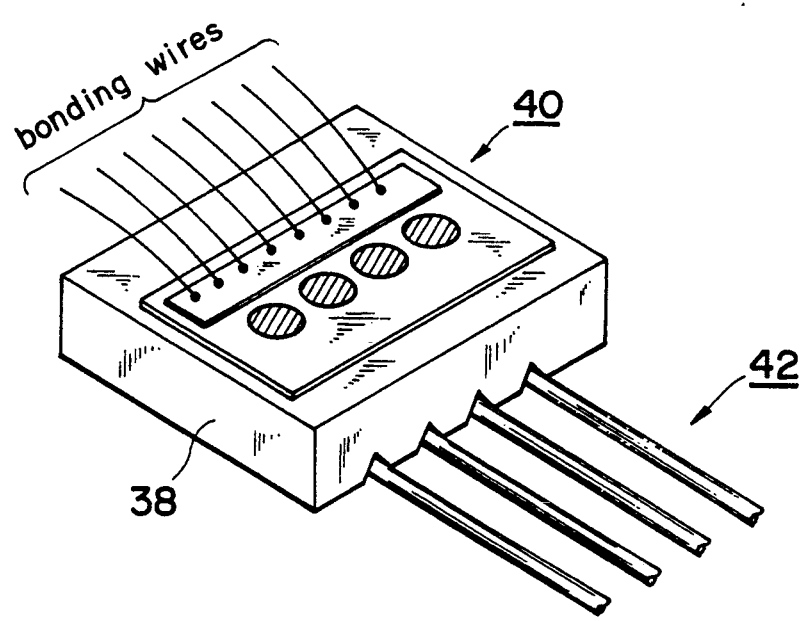
FIG. 14 is a perspective drawing showing an outline structure of an embodiment of the present invention including elements in array.

Next, another embodiment is described with FIG. 14. According to this embodiment, a plurality of grooves are formed in the back surface of the semiconductor substrate 38 so that each of the grooves should face each of light receiving faces of a group of a plurality of light receiving elements 40 mounted in array on the semiconductor substrate 38, using the same manufacturing steps as the first embodiment described above, and a group of optical fibers 42 are fixed in the grooves.

Here, an inclined face is formed at a distal end of each optical fiber of a group of optical fibers 42 just the same as shown in FIG. 3. In this structure, a light signal transmitted through each optical fiber fixed in each groove is reflected by the inclined face and admitted to each light receiving element. And an electrical signal converted from optical signal at each light receiving element is amplified by a pre-amplifier circuit given individually and independently before being output to a predetermined lead terminal through a bonding wire. The entire unit is contained in a hermetically sealed package to prevent light from leaking into.

A plural type is possible corresponding to the embodiments of FIG. 6 and FIG. 9, too.

As shown in the above described embodiments, the present invention can be applied to a light receiving module treating a plurality of optical communications in parallel, and provide very excellent technologies to enable a parallel treating type of light receiving module with excellent optical couples and high durability.

In the embodiments of FIG. 3 or FIG. 6, the cross sectional shape of the groove 28 may be triangular as shown in FIG. 4 or FIG. 7, but may also be trapezoidal. The cross sectional shape of the groove 28 can be made either triangular or trapezoidal, tuning the mask area, concentration of the etching liquid and length of etching time. A trapezoidal shape would provide a better light penetration where the light is admitted after reflected by the inclined face. In case of triangle shape, the light penetrating portion may be etched separately to make a flat face at the top of the triangle. A filling material may be filled up in the gap between the optical fiber and the top of the triangle. A non-reflection coating may be applied at the part of the semiconductor substrate where the light is admitted after reflected by the inclined face, to improve light admittance rate.

In case of FIG. 3, a light traverses the optical fiber 30 and is emitted out after the light is reflected by an inclined face 31 of the optical fiber 30. It means that the optical fiber 30 functions as a convex lens and a light traversing the optical fiber 30 converges and then diverges, which may result in a leak of light to an adjacent light receiving element or an attenuation of the light. To avoid it, the semiconductor substrate 24 may be thinned in thickness or the groove 28 may be made deeper to shorten the path for the light to cross. Or only the part of the semiconductor substrate 24 where a light receiving element 26 should be mounted may be made thinner. When the semiconductor substrate 24 is 0.5 mm thick or so at the part where the light should pass, the light convergence and divergence by the optical fiber 30 does seldom make any problem.

Also in case of an array type module of FIG. 14 corresponding to embodiments of FIG. 3, FIG. 6 and FIG. 9, a thinner substrate 38 improves a coupling efficiency of light, which prevents a light of a certain optical fiber 42 from leaking to adjacent light receiving element 40. It may also work to widen the space between single modules of the array to a certain extent, or to form a deep separating groove between the adjacent light receiving elements by etching. Further, the deep separating groove (not shown) may be coated with silver, aluminum or the like to make a reflecting area.

In case of embodiment FIG. 3, the gap between the inclined face 31 of the optical fiber 30 and the closed end wall 32 of the groove 28 may be void or of air, or be filled with a filling material or adhesive of a sufficiently lower refractive index than that of the optical fiber 30. It provides a total reflection or high rate reflection of a light transmitted through the optical fiber 30 at the inclined face 31 of the distal end of the fiber 30.

The closed end wall 32 of the groove 28 is usually made vertical to the back surface of the semiconductor substrate 24. However, The closed end wall 32 may be inclined at a different angle from that of the inclined face 31 of the optical fiber 30, as long as those faces are not fully in contact with each other. For example, while the inclination angle of the distal end 31 of the optical fiber 30 is 45 degrees, the closed end wall 32 of the groove 28 may be inclined by 54 degrees.

To direct the reflecting face 31 to the light receiving element 26, it may be tuned while a light transmitted through the optical fiber 30 is being admitted to the light receiving element 26, in case of a small amount production of the module. If a mass-production is required to a certain extent, the following steps can be used.

(1) A plurality of optical fibers 30 are fixed on a separate substrate or the like in array.

(2) Those optical fibers 30 are polished as they are set in step (1). All of the optical fibers 30 are polished at the same direction.

(3) Those optical fibers 30 are fixed in the grooves 28 of the semiconductor substrate 24, as they were polished in step (2). Silver, aluminum or the like may be deposited on the inclined face 31 of the optical fiber 30 to improve reflection rate.

In case of embodiment FIG. 6, a filling material of a higher refractive index than that of the semiconductor substrate 24 may be filled in the gap between the optical fiber distal end and the inclined face 33 of the closed end of the groove 28 to improve reflection rate. A refractive coating may be formed by plating on the incidented face 33 of the closed end of the groove 28 to improve reflection index too.

As described above, according to the present invention, the light receiving module comprises a light receiving element mounted on a surface of a semiconductor substrate, a groove formed in a back surface of said semiconductor substrate, facing said light receiving element, and an optical fiber fixed in said groove, which is arranged so that a transmitted light signal is reflected by an inclined face formed at a distal end of said optical fiber and is admitted to a light receiving face of said light receiving element, from said back surface side of said semiconductor substrate, and has a structure in which a light signal transmitted through the optical fiber fixed in the groove is reflected by the inclined face to be admitted in the light receiving element from the back side of the semiconductor substrate. And so, very highly precise optical couple can be realized between the optical fiber and the light receiving element. And since any mechanically movable parts are eliminated, an excellent durability is attained.

And, the groove can be formed with a high precision of location using a conventional method such as planar process, and a uniformity and an improvement of characteristics can be easily realized and the productivity can be improved. Especially, the present invention provides very excellent technologies, when it is applied to a parallel treating type of light receiving module which requires excellent optical couple and durability.

From the invention thus described, it will be obvious that the invention may be varied in many ways. Such variations are not to be regarded as a departure from the spirit and scope of the invention, and all such modifications as would be obvious to one skilled in the art are intended to be included within the scope of the following claims.

What is claimed is:

1. A light receiving module comprising:

a semiconductor substrate having a groove in a first main surface thereof;

a light receiving element mounted on a second main surface of said semiconductor substrate, said first main surface facing said second main surface through said substrate;

an optical fiber fixed in said groove, said optical fiber having first and second end portions, said first end portion having an edge surface inclined with respect to a light transmission direction in said optical fiber, said second end portion being adapted to transmit light input to said optical fiber for transmission of input light to said first end portion for output thereof; and said groove being defined by at least two side surfaces of said substrate that extend in a same direction, and an end wall of said substrate that crosses said side surfaces, said first end portion of said fiber abutting against said end wall of said groove, whereby light input to said optical fiber passes through said fiber and is reflected at said inclined edge surface of said first end portion to pass through said substrate to be input to a light receiving area of said light receiving element.

2. The light receiving module claimed in claim 1, wherein:

a plurality of light receiving elements are mounted on said second main surface; and a plurality of fibers are fixed within a plurality of grooves in said substrate wherein each fiber corresponds to a receiving element such that light transmitted through said fibers and reflected off said inclined edge surfaces of said first end portions is received by said receiving elements.

3. A light receiving module comprising:

a semiconductor substrate having a groove in a first main surface thereof;

a light receiving element mounted on a second main surface of said semiconductor substrate, said first main surface facing said second main surface through said substrate;

an optical fiber fixed in said groove, said optical fiber having first and second end portions, said second end portion being adapted to transmit light input to said optical fiber for transmission of input light to said first end portion for output thereof; and said groove being defined by at least two side surfaces of said substrate that extend in a same direction, and an end wall of said substrate that crosses said side surfaces, said end wall being inclined with respect to the light transmission direction, said first end portion of said fiber abutting against said inclined end wall of said groove, whereby light input to said optical fiber passes through said fiber and is reflected at said inclined end wall of said groove to pass through said substrate to be input to a light receiving area of said light receiving element.

4. The light receiving module claimed in claim 3, wherein:

a plurality of light receiving elements are mounted on said second main surface; and a plurality of fibers are fixed within a plurality of grooves in said substrate wherein each fiber corresponds to a receiving element such that light transmitted through said fibers and reflected off said inclined end walls is received by said receiving elements.

5. A light receiving module comprising:

a semiconductor substrate having a groove and a dimple in a first main surface thereof;

a light receiving element mounted on a second main surface of said semiconductor substrate, said first main surface facing said second main surface through said substrate;

an optical fiber fixed in said groove, said optical fiber having first and second end portions, said second end portion being adapted to transmit light input to said optical fiber for transmission of input light to said first end portion for output thereof; and said groove being defined by at least two side surfaces of said substrate that extend in a same direction, and an end wall of said substrate that crosses said side surfaces, said dimple being formed on an extension line of said groove beyond said end wall, wherein an inclined face is formed at a side wall of said dimple, said side wall facing said end wall of said groove, said first end portion of said fiber abutting against said end wall of said groove, whereby light input to said optical fiber passes through said fiber and is reflected at said inclined side wall of said dimple to pass through said substrate to be input to a light receiving area of said light receiving element.

6. The light receiving module claimed in claim 5, wherein:

a plurality of light receiving elements are mounted on said second main surface;

a plurality of fibers are fixed within a plurality of grooves in said substrate wherein each fiber corresponds to a receiving element; and a plurality of said dimples corresponding to said fibers are provided such that light transmitted through said fibers and reflected off said inclined side walls of said dimples is received by said receiving elements.

* * * * *